Oct. 17, 1933.  C. J. CARROLL  1,930,995
METHOD OF MANUFACTURING CELLULOID TUBING
Filed Dec. 16, 1931
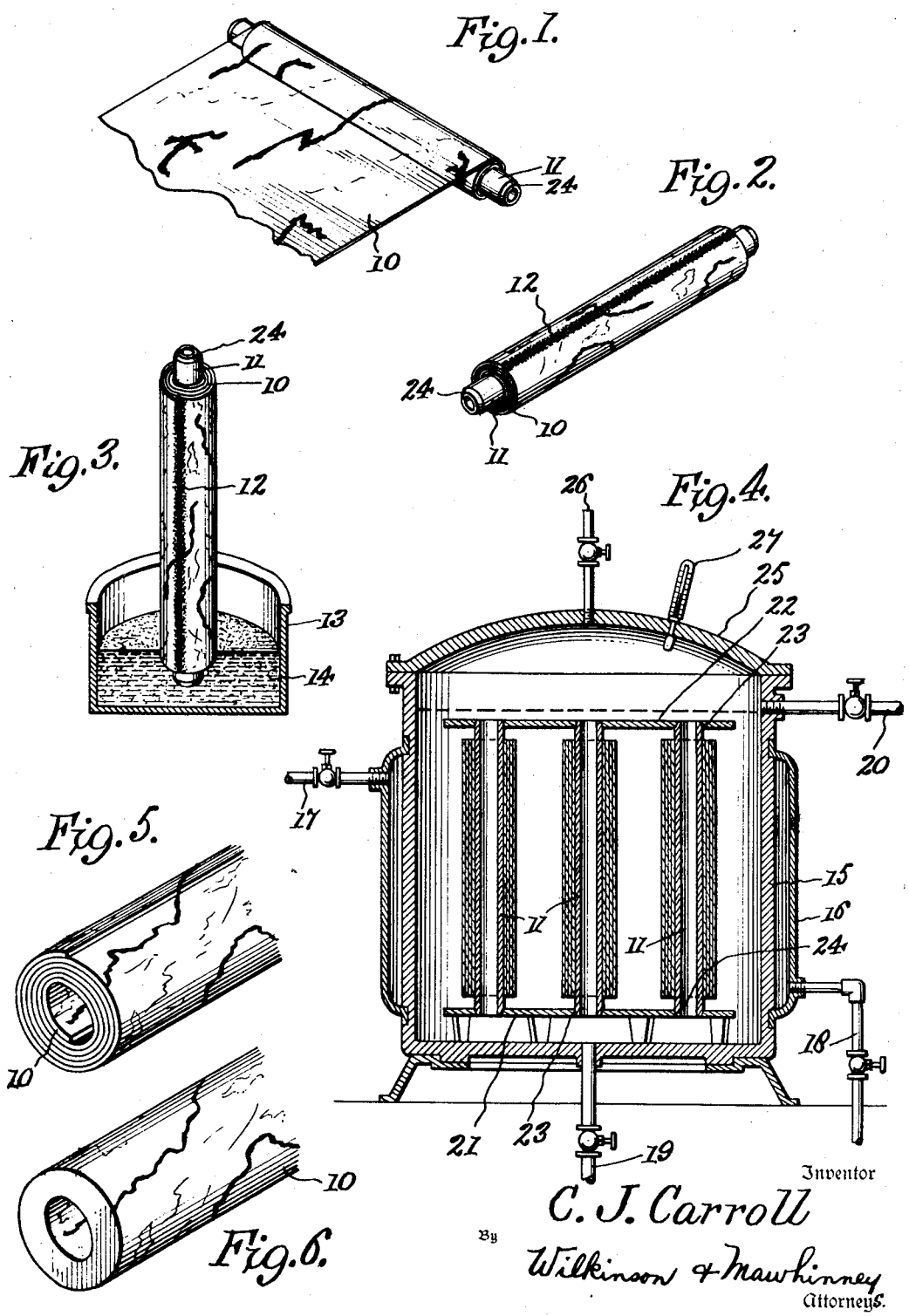
Inventor
C. J. Carroll
By Wilkinson & Mawhinney
Attorneys.

Patented Oct. 17, 1933

1,930,995

UNITED STATES PATENT OFFICE 1,930,995

METHOD OF MANUFACTURING CELLULOID TUBING

Cecil J. Carroll, Stelton, N. J., assignor to Nixon Nitration Works, Nixon, N. J., a corporation of New Jersey Application December 16, 1931
Serial No. 581,526

2 Claims. (Cl. 18—51)

The present invention relates to improvements in methods of manufacturing celluloid tubing, and has for an object to provide an improved method which makes practicable the imitation in tubular form of colors which are now able to be produced only in the form of a solid rod.

Another object of the invention is to produce in tubular form celluloid or pyroxylin material made originally from sheet material, which sheets are wound upon one another in layer or laminated form and subsequently welded together to produce a solid homogeneous mass having color characteristics and designs imitating the solid rods, which rods must be cored out as in the production of fountain pen barrels and other hollow articles.

A further object of the invention is to provide a direct and inexpensive method and process for the production of tubular pyroxylin material.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a perspective view, with parts broken away, and showing the initial step of the method.

Figure 2 is a similar view showing the pyroxylin sheet stock completely wound on the mandrel.

Figure 3 is also a perspective view, with parts broken away, and parts shown in section, and illustrating the end cementing step.

Figure 4 is a vertical section taken through the heat and pressure apparatus and showing the fourth step of the method.

Figure 5 is a fragmentary perspective view showing the condition of the pyroxylin material after winding but prior to welding, and Figure 6 is a similar view showing the completed tubular articles after being subjected to the heat and pressure treatment.

Referring more particularly to the drawing, in Figure 1 is shown a sheet 10 of celluloid or pyroxylin material having a desired color and design. These stock sheets are initially wound about a mandrel 11 into a series of concentric layers or laminations. After a roll of desired diameter is thus formed, the free edge of the sheet is cemented or otherwise affixed to the body of the roll, as indicated at 12 in Figures 2 and 3.

In Figure 3, a receptacle 13 is shown containing a liquid cement 14 into which the ends of the roll are dipped so that the cement will fill the spaces between the ends of the laminated roll, penetrating for an appropriate distance and holding the laminations or layers tightly together; but more especially forming a barrier against the entrance of water and air which would interfere with the coalescing or welding action which subsequently takes place between the laminations of the roll.

In Figure 4, a heat and pressure apparatus is shown, including a container 15 appropriately heated as by a steam jacket 16 having the inlet steam connection 17 and the outlet connection 18 for the water of condensation.

A drain 19 is provided for the tank or container, and a water inlet 20 is provided for the introduction of a body of water directly into the container whereby to envelop the laminated rolls of the pyroxylin material which are supported in the container as upon a stool 21.

The upper ends of the rolls may be kept apart if desired by a spacing plate 22. In the stool 21 and plate 22 are openings 23, preferably tapered. The ends of the mandrel 11 are also preferably tapered, as indicated at 24 in Figures 1, 2 and 3. The tapered ends will prevent the mandrel from slipping through the openings and will, therefore, support the cemented ends of the laminated pyroxylin rolls in spaced relation to the stool and plate, thus giving the water in the container an opportunity to gain access to such ends. The mandrels, being preferably longer than the tubes, will project beyond both ends of the tubes, thus allowing for this spaced support.

The container 15 is supplied with a removable pressure-tight cover 25 having an air relief connection 26 which may also be used to supply steam, if desired. The container is also supplied with an instrument 27 for indicating the pressure within the container.

Of course, it will be understood that the method can be carried out without the association of the mandrel with the sheet or tube. In other words, after the winding of the tube on the mandrel and the cementing of the ends thereof, it may be preferable to then withdraw the mandrel and to subject the coiled tube to the welding operations after the mandrel has been removed.

The sheet of celluloid used will be ordinarily about 10/1000 of an inch in thickness. The mandrel may be of steel or other material. The cementing process will prevent the roll from loosening. This cementing on hardening will seal both ends of the roll.

The roll, thus cemented, is placed in the container shown in Figure 4, which container is then closed. In the container the rolls are submerged in water, which is subjected to high pressure and heated to a high temperature. The water pressure, equal in all directions, presses against the outside and the inside walls of this tubing, or if the tubing is on the mandrel, the water pressure is exerted against the outside, forcing the tubing against the mandrel. In this way, the various laminations of the tubing become welded together, thus transforming the tubing of various layers, as shown in Figure 5, to a solid tube, as shown in Figure 6.

The celluloid sheet is of course mainly transparent, so that the colors and designs on the same show through from inner layers to the outer surface of the article.

I am aware that according to certain prior methods, it has been proposed to wrap sheet stock about a mandrel, but this wrapping is done under a bath of liquid cement, which cement is alone relied on to hold the layers together and to exclude air pockets.

According to the present invention, it is the object to keep the cement away from the major contacting portions of the stock in the tubing and employ same only at the exposed ends for the purpose stated. According to the present invention, the object is to cause the various layers of the sheet to fuse together and form one solid stock by reason of a welding operation achieved through heat and pressure. The welding takes place due to the inherent properties of the pyroxylin when subjected to a high degree of heat and pressure which may be in accordance with the following range: from 170° F. to 210° F.

It will be obvious that various changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:

1. The herein described method for forming pyroxylin tubing, which consists in taking initially very thin flat substantially transparent sheets of pyroxylin bearing designs thereon, wrapping the pyroxylin sheets while free from a bath in a plurality of turns volutely about a common axis whereby to form a roll comprising a plurality of overlapped tight-fitting laminations with a design from an under lamination showing through an outer lamination, cementing the end portions only of the laminated roll and later subjecting the roll to the combined action of heat and pressure while immersed in water with the water freely accessible to the end cemented portions of the roll, whereby to weld transparent decorated laminations one to the other throughout the entire length and circumference without the aid of cement except at the end portions.

2. The herein described method for the formation of pyroxylin tubing, which consists in taking an initial very thin flexible sheet of substantially transparent pyroxylin stock having a design thereon, rolling said stock while exterior to a bath in a plurality of turns concentrically about the same axis whereby to form a roll made up of a plurality of concentric laminations lying in close contact with one another whereby the design of an under lamination may show through an outer lamination, applying solvent to the end portions only of the overlapping laminations and welding the laminations together throughout their entire length and circumference without the use of solvent except at the end portions whereby to form a consolidated tubing.

CECIL J. CARROLL.